United States Patent
Chung

(10) Patent No.: US 10,268,370 B2
(45) Date of Patent: Apr. 23, 2019

(54) CHARACTER INPUT DEVICE AND CHARACTER INPUT METHOD WITH A PLURALITY OF KEYPADS

(71) Applicant: NEOPAD, INC., Seoul (KR)

(72) Inventor: Hee Sung Chung, Seoul (KR)

(73) Assignee: Neopad, Inc., Seoul (KR)

( * ) Notice: Subject to any disclaimer, the term of this patent is extended or adjusted under 35 U.S.C. 154(b) by 430 days.

(21) Appl. No.: 14/891,420

(22) PCT Filed: Mar. 13, 2014

(86) PCT No.: PCT/KR2014/002098
§ 371 (c)(1),
(2) Date: Nov. 16, 2015

(87) PCT Pub. No.: WO2014/185624
PCT Pub. Date: Nov. 20, 2014

(65) Prior Publication Data
US 2016/0110101 A1    Apr. 21, 2016

(30) Foreign Application Priority Data
May 16, 2013  (KR) .................. 10-2013-0055520

(51) Int. Cl.
*G06F 3/048* (2013.01)
*G06F 3/0488* (2013.01)
(Continued)

(52) U.S. Cl.
CPC .......... *G06F 3/04886* (2013.01); *G06F 1/163* (2013.01); *G06F 3/0237* (2013.01)

(58) Field of Classification Search
CPC ..... G06F 3/04886; G06F 3/0237; G06F 1/163
See application file for complete search history.

(56) References Cited

U.S. PATENT DOCUMENTS 8,692,736 B1* 4/2014 Johnston ............. G06F 15/0291
345/1.2
2002/0027549 A1* 3/2002 Hirshberg ............. G06F 3/0234
345/168
(Continued)

FOREIGN PATENT DOCUMENTS

CN       101266520 A      9/2008
JP      2008-282380 A    11/2008
(Continued)

OTHER PUBLICATIONS

Search Report for International Application No. PCT/KR2014/002098.
(Continued)

*Primary Examiner* — Tadesse Hailu
*Assistant Examiner* — Asteway T Gattew
(74) *Attorney, Agent, or Firm* — Westerman, Hattori, Daniels & Adrian, LLP

(57) ABSTRACT

Character input device includes touch screen; word dictionary database; first keypad information database for storing information on first keypad; second keypad information database for storing information on second keypad; first keypad creation unit for displaying the first keypad; first key touch recognition unit for acquiring character code corresponding to value of the first key from the first keypad information database and invoking second keypad creation unit; the second keypad creation unit for creating and displaying the second keypad on the first keypad; second keypad touch recognition unit for acquiring character code corresponding to touch movement from the second keypad information database; input character string creation unit for creating one or more input character strings by combining the character code of the first key with the character codes acquired by the second keypad touch recognition unit; and (Continued)

word recognition processing unit for extracting and displaying character strings of a completed word.

16 Claims, 12 Drawing Sheets

(51) Int. Cl.
*G06F 3/023* (2006.01)
*G06F 1/16* (2006.01)

(56) References Cited

U.S. PATENT DOCUMENTS

| | | | |
|---|---|---|---|
| 2002/0143828 A1* | 10/2002 | Montero | G06F 17/273 715/257 |
| 2003/0001821 A1* | 1/2003 | Shepherd | G06F 3/0233 345/168 |
| 2003/0041147 A1* | 2/2003 | van den Oord | G06F 17/276 709/227 |
| 2003/0067495 A1* | 4/2003 | Pu | 715/811 |
| 2006/0265668 A1* | 11/2006 | Rainisto | G06F 3/0236 715/816 |
| 2010/0004029 A1* | 1/2010 | Kim | G06F 1/1624 455/566 |
| 2010/0302163 A1* | 12/2010 | Ghassabian | G06F 3/0237 345/168 |
| 2011/0209090 A1 | 8/2011 | Meyvis et al. | |
| 2012/0005592 A1* | 1/2012 | Joshi | G06F 3/038 715/746 |
| 2012/0075190 A1 | 3/2012 | Sengupta | |
| 2013/0174091 A1* | 7/2013 | Park | G06F 3/018 715/811 |
| 2014/0098024 A1* | 4/2014 | Paek | G06F 3/04886 345/168 |
| 2014/0189567 A1* | 7/2014 | Lin | G06F 3/04886 715/773 |

FOREIGN PATENT DOCUMENTS

| | | |
|---|---|---|
| JP | 2011-516995 A | 5/2011 |
| JP | 2012-89020 A | 5/2012 |
| JP | 2012-248153 A | 12/2012 |
| KR | 10-0838818 B1 | 6/2008 |
| KR | 10-2009-0049903 A | 5/2009 |
| KR | 10-1122366 B1 | 3/2012 |
| KR | 10-2012-0077890 A | 7/2012 |

OTHER PUBLICATIONS

Written Opinion for International Application No. PCT/KR2014/002098.

"How to input characters", REGZA Phone IS04FV, Japan, and KDDI, Inc.; pp. 61-72; with English translation; cited in Japanese Office Action dated Sep. 23, 2016.

Office Action dated Sep. 23, 2016, issued in counterpart Japanese Application No. 2016-513861, with English machine translation. (7 pages).

Office Action dated May 19, 2017, issued in counterpart Chinese Application No. 201480028577.1, with English translation. (22 pages).

* cited by examiner

| Center point coordinate value of first key (x, y) | First key code (Unicode) | Character label |
|---|---|---|
| (30,40) | 0041 | A |

FIG. 2

| Center point coordinate value of second keypad character key (x, y) | Codes of second keypad character key | Character label |
|---|---|---|
| (40,50) | 0041, 0042, 0043 | A B C |

CHARACTER INPUT DEVICE AND CHARACTER INPUT METHOD WITH A PLURALITY OF KEYPADS

BACKGROUND OF THE INVENTION

1. Field of the Invention

The present invention relates to a character input device and a character input method, and more specifically, to a character input device and a character input method, which can easily input characters by doubly providing a character keypad of various shapes, the keypad capable of inputting characters through a touch or non-touch action.

2. Background of the Related Art

New mobile computing devices such as a glass or wrist watch type wearable computer, a flexible display type smart phone and the like are introduced recently. Physical forms of such devices are different from the forms of current smart phones, tablet PCs or the like. Particularly, wearable type or flexible display type character input devices will be different greatly according to the character input environment of a user, as well as the physical forms.

In addition, a touch screen provided in a wearable portable terminal is limited in size of a character input device due to the limited size of the portable terminal. Therefore, difficulties are expected in displaying a character keypad and inputting characters on a touch screen of the portable terminal.

Since whether or not a character input device is installed in a wearable computing device will be an important data for determining the value of a product, a character input device and a method thereof which can expect efficiency and accuracy of character input are indispensable factors in the wearable computing device.

Therefore, a mobile device or a wearable computing device including a smart phone needs a further improved character input method, considering physical forms of a character input device and a character input environment of a user.

SUMMARY OF THE INVENTION

Therefore, the present invention has been made in view of the above problems, and it is an object of the present invention to doubly provide small keypads for minimizing a moving distance of a finger between keys in a character input device of various shapes, the keypad capable of inputting characters through a touch or non-touch action.

Another object of the present invention is to provide a character input device and a character input method, which can virtually provide a second keypad capable of simultaneously inputting a plurality of characters when beginning of touch is sensed from a first keypad, which is a real keypad, and provide a word recognition function capable of determining whether or not a character string input through the second keypad is a word defined in a word dictionary database.

Still another object of the present invention is to provide a character input device and a character input method, which can display suffixes that can be added to the character strings input through the second keypad and add a suffix selected by a user among the displayed suffixes as a suffix of a character string (or word) selected by the user.

Still another object of the present invention is to provide a character input device and a character input method, which can rapidly and correctly input a word desired to input without pressing several key areas several times when characters are input using a touch screen.

Still another object of the present invention is to provide a character input device and a character input method, which can improve efficiency of character input by reducing a moving distance of a finger required for the character input, improving accuracy of character key touch, and minimizing motions of a hand in a variety of character input environments of a user.

To accomplish the above objects, according to one aspect of the present invention, there is provided a character input device including: a touch screen; a word dictionary database; a first keypad information database for storing information on a first keypad; a second keypad information database for storing information on a second keypad; a first keypad creation unit for displaying, in a character input mode, the first keypad configured of at least one or more character keys on the touch screen; a first key touch recognition unit for acquiring, when touch of a first key is sensed from the first keypad, a character code corresponding to a value of the first key from the first keypad information database and invoking a second keypad creation unit; the second keypad creation unit for creating and virtually displaying the second keypad on the first keypad according to the invocation of the first key touch recognition unit; a second keypad touch recognition unit for acquiring, when a touch movement action is sensed from the second keypad, at least one character code corresponding to the touch movement action from the second keypad information database; an input character string creation unit for creating at least one or more input character strings by combining the character code of the first key with the character codes acquired by the second keypad touch recognition unit; and a word recognition processing unit for extracting and displaying character strings of a completed word by performing character string pattern matching between the created input character strings and words stored in the word dictionary database.

If a character string of a completed word does not exist as a result of performing the character string pattern matching, the word recognition processing unit may determine whether or not a user-defined word registration command is input and, if the user-defined word registration command is input, store the input character string in a user-defined word database as a user-defined word.

The character input device may further include a word suffix database for storing suffixes of words, in which the word recognition processing unit may acquire and display suffixes that can be added to the displayed character strings from the word suffix database and add a suffix selected by a user among the displayed suffixes as a suffix of a word selected by the user.

The first keypad creation unit may create the first keypad configured of character keys having at least one shape among a dot shape, a straight line shape, a curved line shape, a polygonal shape, a circular shape, and a colored shape.

Coordinate values according to shapes and sizes of the character keys configuring the first keypad and at least one of character codes and character labels corresponding to center point coordinate values of the character keys arranged on the first keypad may be stored in the first keypad information database.

When touch of the first key is sensed from the first keypad, the first key touch recognition unit may acquire a center point coordinate value corresponding to the first key and extract a character code corresponding to the acquired center point coordinate value from the first keypad information database.

When touch of the first key is sensed from the first keypad, the first key touch recognition unit may acquire a center point coordinate value corresponding to the first key, extract a character code corresponding to the acquired center point coordinate value from the first keypad information database, and then create another character code of the first key using information obtained by combining the character code with information on an up, down, left or right movement direction.

Coordinate values according to a shape and a size of the second keypad, center point coordinate values of character keys defined and arranged as one character key on the second keypad, and at least one of at least one or more character codes and character labels corresponding to each center point coordinate value may be stored in the second keypad information database.

The second keypad creation unit may create the second keypad and virtually and visibly or invisibly display the second keypad on the first keypad.

The second keypad creation unit may create the second keypad configured of character keys having at least one shape among a dot shape, a straight line shape, a curved line shape, a polygonal shape, a circular shape and colored shape.

The touch movement action may include at least one of tapping, dragging, flicking and sliding and may be an action continued from a first key touch action without a pause.

The second keypad touch recognition unit may acquire a coordinate value according to the touch movement action on the second keypad and extract at least one or more character codes corresponding to the acquired coordinate value from the second keypad information database.

When a touch movement action is not sensed from the second keypad, the second keypad touch recognition unit may display a character corresponding to the character code corresponding to the value of the first key acquired by the first key touch recognition unit on the touch screen.

According to another aspect of the present invention, there is provided a method of inputting characters in a character input device provided with a touch screen, the method including the steps of: (a) displaying, in a character input mode, a first keypad configured of at least one or more character keys on the touch screen; (b) acquiring, when touch of a first key is sensed from the first keypad, a character code corresponding to a value of the first key, and creating a second keypad including a character key of the first key and displaying the second keypad on the touch screen; (c) acquiring, when a touch movement action is sensed from the second keypad, at least one character code corresponding to the touch movement action; (d) creating at least one or more input character strings by combining the character code of the first key with the character codes acquired from the second keypad; and (e) extracting and displaying character strings of a completed word by performing character string pattern matching between the created input character strings and words stored in a word dictionary database.

The method of inputting characters may further include, after step (e), the steps of: determining, when a specific character string is selected among the character strings of a completed word, whether or not a suffix that can be added to the selected character string exists; displaying, if suffixes that can be added exist as a result of the determination, the suffixes that can be added; and adding and displaying a suffix selected by a user among the displayed suffixes as a suffix of the selected character string.

At step (e), if a character string of a completed word does not exist as a result of performing the character string pattern matching, whether or not a user-defined word registration command is input is determined, and if the user-defined word registration command is input, the input character string may be stored in a user-defined word database.

Step (b) may include the steps of acquiring, when touch of the first key is sensed from the first keypad, a center point coordinate value of the first key; acquiring a character code corresponding to the center point coordinate value of the first key by searching a first keypad information database provided in advance; and creating the second keypad including the character keys of the first keypad and displaying the second keypad on the first keypad.

In addition, step (b) may include the steps of acquiring, when touch of the first key is sensed from the first keypad, a character code corresponding to a center point coordinate value of the first key; and creating, when a touch movement is sensed from the first key, another character code of the first key using information obtained by combining information on a touch movement direction with a code value of the first key.

BRIEF DESCRIPTION OF THE DRAWINGS

FIG. 2 is an exemplary view showing the structure of a first keypad information database according to an embodiment of the present invention.

FIG. 3 is an exemplary view showing the structure of a second keypad information database according to an embodiment of the present invention.

DESCRIPTION OF SYMBOLS

Figure 1:
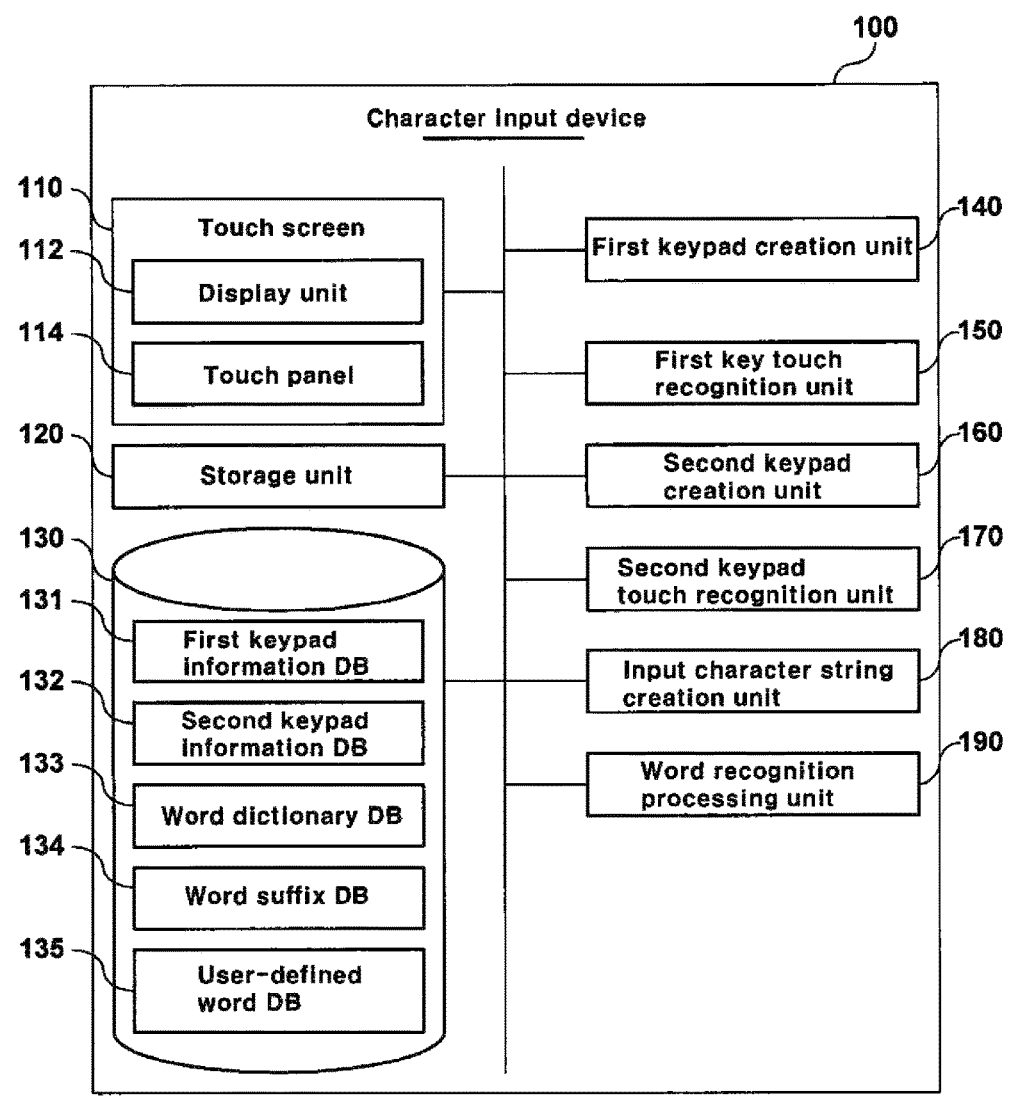
FIG. 1 is a block diagram schematically showing the configuration of a character input device according to an embodiment of the present invention.

100: Character input device
110: Touch screen
120: Storage unit
130: Database
140: First keypad creation unit
150: First key touch recognition unit
160: Second keypad creation unit
170: Second keypad touch recognition unit
180: Input character string creation unit
190: Word recognition processing unit

DETAILED DESCRIPTION OF THE PREFERRED EMBODIMENT

Details of the objects, technical configurations, and operational effects of the present invention described above will be further clearly understood hereinafter according to the detailed descriptions with reference to the drawings accompanied in the specification of the present invention.

A first keypad described below may be referred to as a real keypad, and a second keypad may be referred to as a virtual keypad. The second keypad is virtually created on the first keypad, and the first keypad and the second keypad are formed of independent character key structures and character codes and provided with an independent character input mode, respectively.

Figure 4:
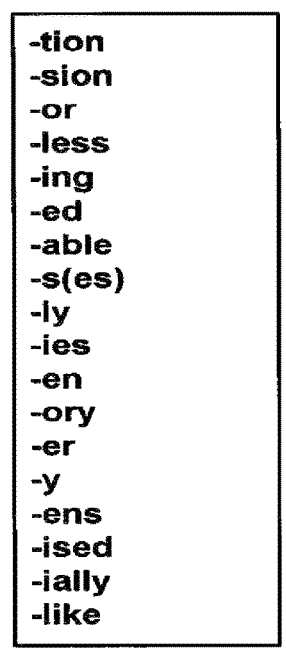
FIG. 4 is a view describing a suffix list stored in a word suffix database according to an embodiment of the present invention.
Figure 5:
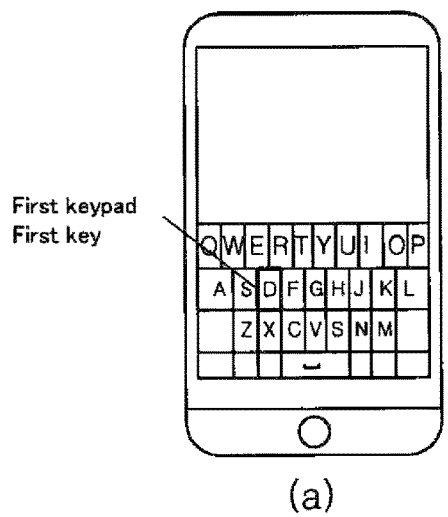
FIG. 5 is an exemplary view showing a first keypad according to an embodiment of the present invention.
Figure 5:
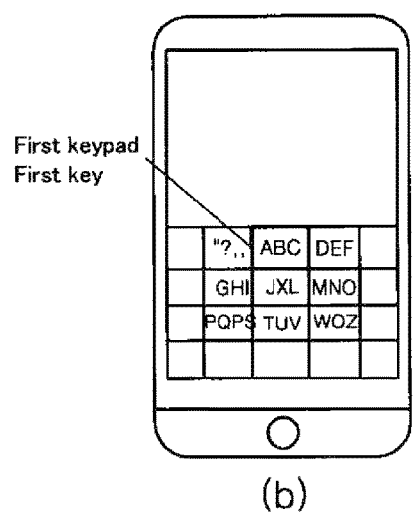
Figure 5:
Figure 6:
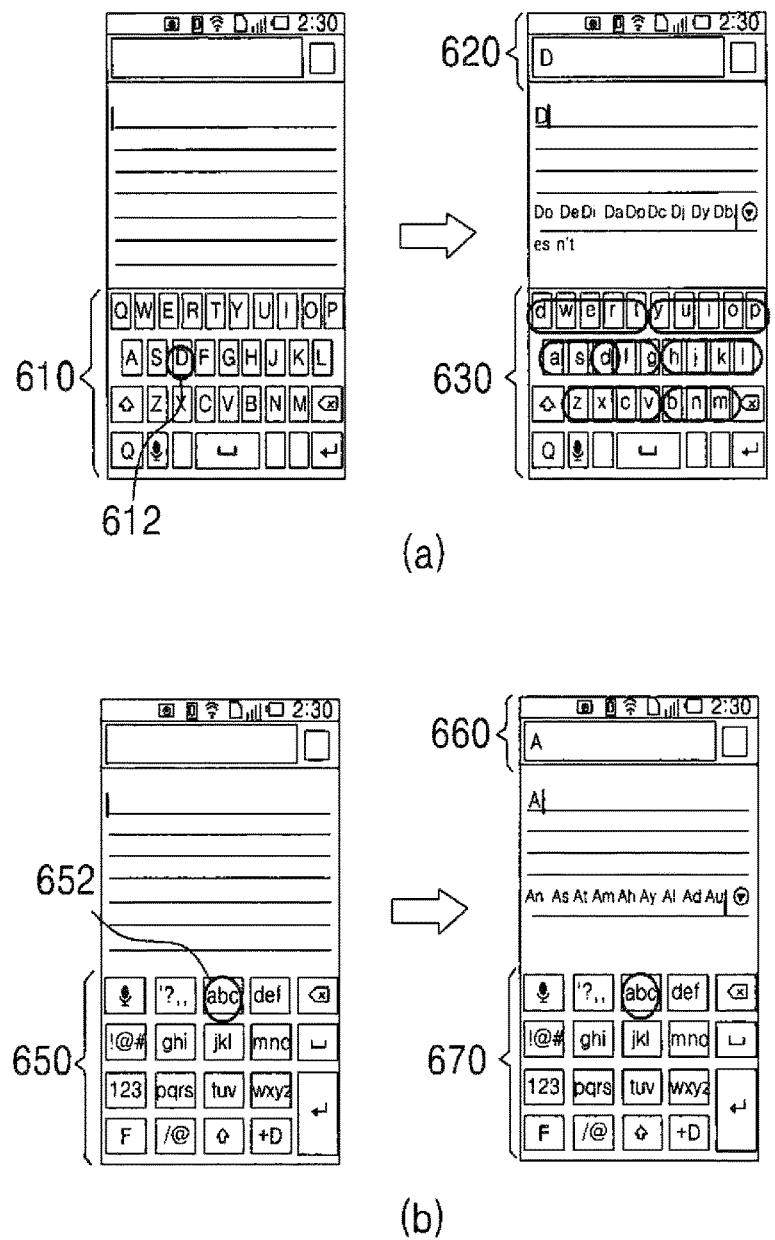
FIG. 6 is an exemplary view showing a second keypad invisibly formed on the first keypad according to an embodiment of the present invention.
Figure 7:
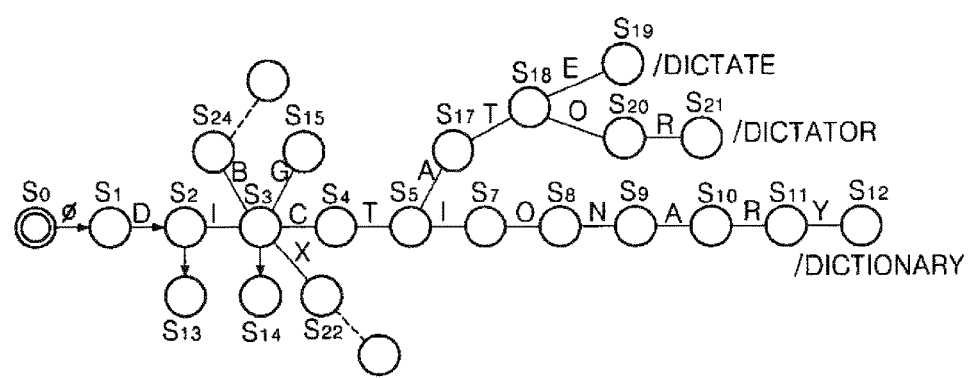
FIG. 7 is an exemplary view showing a word data structure stored in a word dictionary database according to an embodiment of the present invention.

FIG. 1 is a block diagram schematically showing the configuration of a character input device according to an embodiment of the present invention, FIG. 2 is an exemplary view showing the structure of a first keypad information database according to an embodiment of the present invention, FIG. 3 is an exemplary view showing the structure of a second keypad information database according to an embodiment of the present invention, FIG. 4 is a view describing a suffix list stored in a word suffix database according to an embodiment of the present invention, FIG. 5 is an exemplary view showing a first keypad according to an embodiment of the present invention, FIG. 6 is an exemplary view showing a second keypad invisibly formed on the first keypad according to an embodiment of the present invention, and FIG. 7 is an exemplary view showing a word data structure stored in a word dictionary database according to an embodiment of the present invention.

Referring to FIG. 1, a character input device 100 includes a touch screen 110, a storage unit 120, a database 130, a first keypad creation unit 140, a first key touch recognition unit 150, a second keypad creation unit 160, a second keypad touch recognition unit 170, an input character string creation unit 180 and a word recognition processing unit 190.

The touch screen 110 includes a display unit 112 and a touch panel 114. The display unit 112 displays a state of the character input device 100. At this point, the display unit 112 may be implemented in a liquid crystal display (LCD) or the like.

The touch panel 114 is mounted on the display unit 112 and has a touch sense unit (not shown) and a signal conversion unit (not shown). The touch sense unit senses whether or not a touch device contacts with the touch screen, which senses generation of a touch by detecting changes of, for example, resistance or capacitance. Here, the touch device may include a hand of a user, a touch pen, a stylus pen, a mouse and the like. The signal conversion unit converts changes of physical quantity into a touch signal. The touch sense unit may be configured of a touch sensor of a capacitive overlay, a resistive overlay, an infrared beam or the like or may be configured of a pressure sensor, and it is not limited thereto and may include all kinds of sensors capable of sensing contact or pressure of an object.

The touch screen 110 may also include a device having an interface capable of inputting a character only through a touch action on a specific character key without directly touching the character key.

The touch screen 110 can be implemented in a variety of materials or shapes and makes it possible to input a character through a touch or non-touch action.

The storage unit 120 performs a function of storing programs and data needed for operation of the character input device 100.

The database 130 includes a first keypad information database 131, a second keypad information database 132, a word dictionary database 133, a word suffix database 134 and a user-defined word database 135.

The first keypad information database 131 stores coordinate values according to the shapes and sizes of the character keys configuring the first keypad, center point coordinate values of the character keys arranged on the first keypad, character codes and character labels corresponding to each center point coordinate value. Here, the shapes of the characters keys configuring the first keypad may be a shape of a square, a circle, a straight line, a dot, a character, a color or the like, and the shapes and sizes of the character keys may be arbitrarily determined and visibly or invisibly expressed according to the features of the physical configuration of a wearable computing device.

The first keypad information database 131 stores information on the first keypad in the form of a character key layout table as shown in FIG. 2. Referring to FIG. 2, the first keypad information database 131 stores center point coordinate value "(30, 40)" of a first key arranged on the first keypad, character code "0041" of the first key, character label "A" of the first key and the like.

The first keypad stored in the first keypad information database 131 is provided to the first keypad creation unit 140 in the character input mode.

The second keypad information database 132 stores information on the second keypad. That is, the second keypad information database 132 stores center point coordinate values of the character keys arranged on the second keypad, and at least one or more character codes and character labels on the second keypad corresponding to each center point coordinate value. Here, the center point coordinate value of a character key arranged on the second keypad is a center point coordinate value of a character key representing character keys of a character key group created by grouping at least one or more character keys arranged on the first keypad, and at least one or more character codes and character labels can be defined for the center point coordinate value of each character key. As a method of grouping the character keys of the first keypad, one or more character keys of the first keypad can be gathered and assigned or specified to one key of the second keypad. For example, two, three, four or five characters can be arbitrarily assigned to one character key. The larger the number of characters assigned to one key, the wider the character key touch area will be, however, two to five characters may be preferable. If character keys grouped and assigned as described above are defined, the second keypad information database 132 are configured on the basis of the information.

Accordingly, the second keypad information database 132 stores coordinate values according to the shapes and sizes of the character keys configuring the second keypad, center point coordinate values of the character keys defined and arranged as one character key on the second keypad, and a plurality of character codes and character labels corresponding to each center point coordinate value. Here, the shapes of the characters keys configuring the second keypad may be a shape of a square, a circle, a straight line, a dot, a character, a color or the like, and although the shapes and sizes of the character keys may be arbitrarily determined and visibly or invisibly expressed, it may be preferable that the character keys of the second keypad are formed in a shape the same as those of the first keypad. The center point coordinate values of the character keys arranged on the second keypad may be expressed as a center point coordinate value of a character key regardless of a size of the character key (an area expressing the character key). For example, one or more coordinate values may be set in advance in the case of a character key shaped in a dot, coordinate values of about three pixels may be set in advance in the case of a character key shaped in straight line, and coordinate values smaller than the number of coordinate values expressing an area may be set in advance in the case of a character key having an area If a representative coordinate value of the character keys included in each group, among the coordinate values assigned to the character keys of the second keypad as described above, is selected as a center point coordinate value and the center point coordinate value is defined in advance in the second keypad information database 132, a center point coordinate value of a corresponding character key is acquired when a specific character is touched.

Since information on the Character keys defined for the second keypad is stored in the second keypad information database 132 and character codes corresponding to the character keys arranged on the second keypad are assigned, a plurality of character codes is created to make it possible to input a plurality of characters when a character key of the second keypad is input by touch.

The second keypad information database 132 stores information on the second keypad in the form of a character key layout table as shown in FIG. 3.

FIG. 3 is an exemplary view showing a case of storing center point coordinate values of the character keys arranged on the second keypad and character codes and character labels on the second keypad corresponding to the center point coordinate values in the second keypad information database 132. In this case, center point coordinate value "(40, 50)" of a character key arranged on the second keypad, character codes "0041", "0042" and "0043" assigned to the character key and character labels "A, B, C" of the character key are stored in the second keypad information database 132 as information on the second keypad When "ABC" are grouped to configure one key on the second keypad as described above and a user touches the key, three character codes of "ABC" can be created simultaneously. Such a character key layout table of the second keypad is a character array and character code format file of the second keypad stored in the system as a program. The character keys belonging to the second keypad may be used by previously marking together with the first key on the first keypad.

Words of a specific language are defined in the word dictionary database 133, and word character strings are stored therein as a data structure that can be processed by a computer. Here, the language may include Korean, Japanese, Chinese, Arabic, Hindi, Russian and the like. That is, vocabulary sets used in a specific language are defined and arranged in the word dictionary database 133 together with a word list of a language dictionary, and they may be a form of an electronic dictionary which compiles the word list as a data structure such as a TRIE or the like for system's internal operation.

Suffixes of words are stored in the word suffix database 134. The word suffix database 134 may be configured as a data structure the same as that of the word dictionary database 133 and may be used after being systematically connected to the word recognition processing unit 190. Generally, a suffix is part of a predicate or a predicative postposition changing through conjugation, and suffixes of a word may vary from language to language, and it can be a postposition or an idiomatic phrase depending on the language. A suffix stored in the word suffix database 134 is valid if it needs to be added to the ending part of a word which is recognized and selected as a word.

For example, referring to the English word suffix database shown in FIG. 4, suffixes such as '-tion', '-sion', '-or', '-less', '-ing' and the like may be stored in the word suffix database.

An input character string specified by a user is stored in the user-defined word database 135 as a user-defined word. By defining and registering an input character string specified by the user as a word, the user-defined word database 135 can be configured as a structure the same as that of a word dictionary data and may be used together with the word dictionary database 133.

In the character input mode, the first keypad creation unit 140 displays a first keypad configured of at least one or more character keys on the touch screen 110. At this point, the first keypad creation unit 140 creates a first keypad configured of character keys having at least one shape among a dot shape, a straight line shape, a curved line shape, a polygonal shape, a circular shape, and a colored shape. Here, the shapes of character keys may be understood as a method of showing the user the characters only as a character on the touch screen and implementing physical shapes of the characters in a variety of ways within the device. For example, a character input device may be implemented by expressing a character key "ABC" as three pixels on the touch screen, and the character key may be simply expressed as a character label "ABC" without distinguishing character key areas on the touch screen of the user.

The first keypad created by the first keypad creation unit 140 may be set in advance, and the first keypad may be a keypad having a general QWERTY-type key array as shown in FIG. 5a, a 12-key based character keypad as shown in FIG. 5b, or a watch or ring type keypad having a modified structure as shown in FIG. 5c. That is, the first keypad or the second keypad may be configured in the form of arranging character keys of a country on a standard key array of a computer such as QWERTY or may be configured in the form of overlaying character keys of a country on one key on a keypad having a key array of a small number of keys. In addition, the first keypad or the second keypad may be implemented in a keypad configured of a subset of row-column character keys of a keyboard having a character array the same as that of a computer keyboard, a keypad configured of some character keys among the character keys in a 10-key standard array of a telephone, or a keypad configured of character keys formed in a character shape or a figure having a peculiar structure and shape.

The first keypad creation unit 140 performs a function of providing a first keypad having a character input function on the display unit 112 of the character input device 100 in response to a request of a user.

When touch of a first key is sensed from the first keypad, the first key touch recognition unit 150 acquires a character code corresponding to a value of the first key from the first keypad information database 131 and invokes the second keypad creation unit 160. Here, the first key is a key input first by touch when a character is input among the character keys on the first keypad, and the first key generally refers to a character key input first when a specific word is input. The method of inputting the first key may vary according to a method of providing the keypad, and since various methods such as tapping, flicking, sliding and the like are commercialized, any one of the methods can be used.

Hereinafter, operation of the first key touch recognition unit 150 will be described in further detail.

The first key touch recognition unit 150 acquires a center point coordinate value of a first key touched first among the character keys arranged on the first keypad. Since a touch panel is basically provided with pixel data, the first key touch recognition unit 150 may acquire a coordinate value (X, Y) corresponding to the center point of a key positioned at the touch beginning point.

If the center point coordinate value of the first key initially touched is acquired, the first key touch recognition unit 150 may acquire a character code corresponding to the center point coordinate value by searching the first keypad information database 131. Since character codes corresponding to the center point coordinate values of the character keys arranged on the first keypad are stored in the first keypad information database 131, the first key touch recognition unit 150 may acquire a character code of the first key from the first keypad information database 131.

In addition, when a touch movement is sensed from the first key, the first key touch recognition unit 150 may arithmetically calculate a center point coordinate value of a moved point acquired according to the up, down, left or right touch movement starting from the center point coordinate value of the first key, and acquire another character code of the first key using information obtained by combining information on the touch movement direction obtained through the arithmetic operation with the code value of the first key. Here, the arithmetic operation may be an subtraction operation between the center point coordinate value of the first key touch point and the center point coordinate value of the touch-moved point.

For example, a case in which the center point coordinate value of the first key is (30, 30) and the center point coordinate value of the touch-moved point is (30, 40) will be described. In this case, since the difference between the two center point coordinate values is "30−30=0" and "40−30=10", it can be understood that there is no change in the horizontal direction and the touched point is moved upward (toward the top). Information on the touch movement direction of up, down, left and right can be acquired through the arithmetic operation described above. As a result, another character code of the first key can be acquired based on the information obtained by combining the character code of the first key and information on the up, down, left and right touch movement.

If touch input of the first key begins, the first key touch recognition unit 150 like this may invoke the second keypad creation unit 160 at the same time as the character of the first key is input to start creation and display of the second keypad, and open the word dictionary database 133 and perform a pattern matching work between the data structure of the word character strings stored therein and an input character of the first key.

According to the invocation of the first key touch recognition unit 150, the second keypad creation unit 160 groups a plurality of character keys of the first keypad and assigns the grouped character keys to one character key arranged on the second keypad, creates the second keypad having a function of creating a plurality of character codes from one key input, and virtually displays the second keypad on the touch screen 110. At this point, the second keypad creation unit 160 may create the second keypad and virtually and visibly or invisibly display the second keypad on the first keypad, and the shape of the second keypad may be the same as that of the first keypad.

Cases of creating and displaying a second keypad on a first keypad by the second keypad creation unit 160 will be described with reference to FIG. 6.

First, FIG. 6a is a view showing a second keypad displayed on a first keypad based on an English QWERTY keyboard. Referring to FIG. 6a, if a user inputs by touch character key 'D' 612 as a first key on the first keypad 610, a second keypad 630 is displayed on the first keypad at the same time as character 'D' is displayed in the character input window 620, and the character input mode is switched to the second keypad input mode. Although twenty six character keys are configured on the first keypad 610, six character keys of 'qwert', 'yuiop', 'asdfg','hjkl', 'zxcv' and 'bnm' are configured on the second keypad 630. This means that one character key is assigned to each of the six character key groups of 'qwert', 'yuiop', 'asdfg','hjkl', 'zxcv'and 'bnm'. The second keypad creation unit 160 may make the shape of the second keypad visible or invisible to the user.

Next, FIG. 6b is a view showing a second keypad displayed on a first keypad based on the character array of a telephone keypad (referred to as an ABC key array). Referring to FIG. 6b, if a user begins to touch character key 'A' 652 as a first key on the first keypad 650, the second keypad creation unit 160 displays character 'A' in the character input window 660 at the same time as touch of the first key begins, and creates and invisibly displays a second keypad 670 on the first keypad 650. At this point, if the user inputs by touch a certain character key on the second keypad 670, the character input mode is switched to a second keypad input mode for simultaneously displaying a plurality of characters assigned to the touched character key. This is a case in which shapes of the first keypad 650 and the second keypad 670 are the same, and a plurality of characters is assigned to a character key on the second keypad 670 in advance. Accordingly, if any one key is input by touch in the second keypad input mode, a plurality of character codes is created and displayed.

As described above, the second keypad creation unit 160 may provide an interface for easily recognizing a character key which can be input from the second keypad by displaying a shape of a second keypad of a configuration the same as that of the second keypad in the character input window at the same time as the second keypad is created on the first keypad.

When a touch movement action is sensed from the second keypad, the second keypad touch recognition unit 170 acquires a character corresponding to the touch movement action from the second keypad information database 132 and displays the character on the touch screen 110. Here, the touch movement action includes tapping, dragging, flicking, sliding and the like, and it may be an action continued from a first key touch action without a pause. Character input of a user on the second keypad, which is virtually created on the first keypad, is accomplished by the touch movement action of the user, and if the touch action ends without a touch movement action, a character corresponding to the character code of the first key is output. At this point, displaying a character on the touch screen 110 means output of the character in the character input window of the touch screen 110.

That is, the second keypad touch recognition unit 170 acquires a center point coordinate value of the moved character key according to the touch movement action on the second keypad, extracts a plurality of character codes corresponding to the acquired center point coordinate value from the second keypad information database 132, and displays characters corresponding to the extracted character codes on the touch screen 110.

The input character string creation unit 180 creates at least one or more input character strings by combining the character code of the first key acquired by the first key touch recognition unit 150 with the character codes acquired by the second keypad touch recognition unit 170.

That is, the input character string creation unit 180 may create input character strings by combining the character code created when the first key is input with a plurality of character codes created by the input of a character key belonging to the second keypad.

For example, a method of creating input character strings on the keypad of FIG. 6a will be described. In this case, if key 'YUIOP' is input by touch on the second keypad assuming that an input character of the first key of the first keypad is 'D', the input character string creation unit 180 may create five input character strings such as 'DY', 'DU', 'DI', 'DO' and 'DP' by combining five characters 'Y', 'U', 'I', 'O' and 'P' included in the 'YUIOP' key with 'D' of the first key. Character input is performed on the second keypad after the touch input of the first key until input of a word is completed. Accordingly, if key 'ZXCVB' is subsequently input by touch on the second keypad, the input character string creation unit 180 creates twenty input character strings such as 'DYZ, DYX, DYC, DYV, DYB, DUZ, DUX, DUC, DUV, DUB, DIZ, DIX, DIC, DIV, DIB, DOZ, DOX, DOC, DOV and DOB' by combining 'Z', 'X', 'C', 'V' and 'B' included in the 'ZXCVB' key with 'DY', 'DU', 'DI', 'DO' and 'DP' created before and displays the character strings on the touch screen. At this point, the input character string creation unit 180 may store the created input character strings in the storage unit and display only some of the input character strings. The user may select a desired input character string among the input character strings displayed on the touch screen.

The word recognition processing unit 190 extracts and displays character strings corresponding to a completed word by performing character string pattern matching between the input character strings created by the input character string creation unit 180 and words stored in the word dictionary database 133. That is, the word recognition processing unit 190 may extract and display character strings corresponding to a completed word by performing character string pattern matching between an input character string selected by the user among the input character strings created by the input character string creation unit 180 and the words stored in the word dictionary database 133.

If input of the first key begins (touch begins), the word recognition processing unit 190 opens the word dictionary database 133 and performs a character string pattern matching process between the character strings of a word registered in a word dictionary and compiled as a TRIE structure and an input character string, starting from the first characters. In other words, using information on the code created at the same time as the touch input of the first key begins, the word recognition processing unit 190 may open the word dictionary database 133 and perform a pattern matching comparison between the input character string and the word character strings in accordance to the state transition data structure of the word character strings, and if the input character string is included in the state transition data of the word character strings, it may display the input character string as a completed word list.

The data structure of the word character strings in the word dictionary database 133 may be as shown in FIG. 7. The data structure shown in FIG. 7 uses a finite state automata model, and FIG. 7 shows a state transition diagram of character strings as an automata expression which extracts and exemplifies part of data of words registered in the word dictionary database 133, compiled as a TRIE structure and starting with a first character of 'D'.

If the character string pattern matching is performed for the first input character 'D' in the word character string state transition diagram of FIG. 7, a character string matching to character 'D' is 'D' in the word character string state transition diagram. A complete word can be found by a second input of the second keypad while the first character 'D' is input, and since it could be known that the complete word is 'DO', it is always possible to find and output a word completed one character ahead. That is, a word 'DO' can be recognized and output only through input of the first character 'D'. Subsequently, if second character key 'YUIOP' is input, a word 'DID' can be found and output in advance. Then, if character string transition and pattern matching of the character string state transition diagram is performed using an input character string with which input of third character key 'ZXCVB' is performed, all words having a completed character string are extracted from the word dictionary database 133 using an input character string matching to part of a word registered in advance, and the extracted input character strings can be output. As a result, character strings completed as a word such as 'DICTATE', 'DICTATOR', 'DICTION' and 'DICTIONARY' can be extracted and output. In addition, when the extracted words are output, the words may be sorted and output in order of a high use frequency. If the user selects a desired word among the output words, input of a word is completed.

If a character string of a completed word does not exist as a result of performing the character string pattern matching, the word recognition processing unit 190 may store the input character string into the user-defined word database 135.

The word recognition processing unit 190 may acquire and display suffixes that can be added to the character strings completed as a word from the word suffix database 134 and add a suffix selected by the user among the displayed suffixes as a suffix of a word (character string) selected by the user. That is, if the user selects a specific word from a word list of character strings completed as a word, the word recognition processing unit 190 searches the word suffix database 134 and determines whether or not suffixes that can be added to the selected word exist. If suffixes that can be added exist as a result of the determination, the word recognition processing unit 190 displays the suffixes that can be added, and if a suffix is selected among the displayed suffixes, the selected suffix is added as a suffix of the selected word.

The character input device 100 described above can be applied to any user device provided with a touch screen. For example, the character input device can be applied to various devices such as a notebook computer, a mobile communication terminal, a smart phone, a portable media player (PMP), a personal data assistant (PDA), a tablet PC, a set-top box, a smart TV and the like. In addition, the character input device 100 can be applied to a mobile or wearable computing device of various materials or shapes, the keypad capable of inputting characters through a touch or non-touch action.

Figure 8:
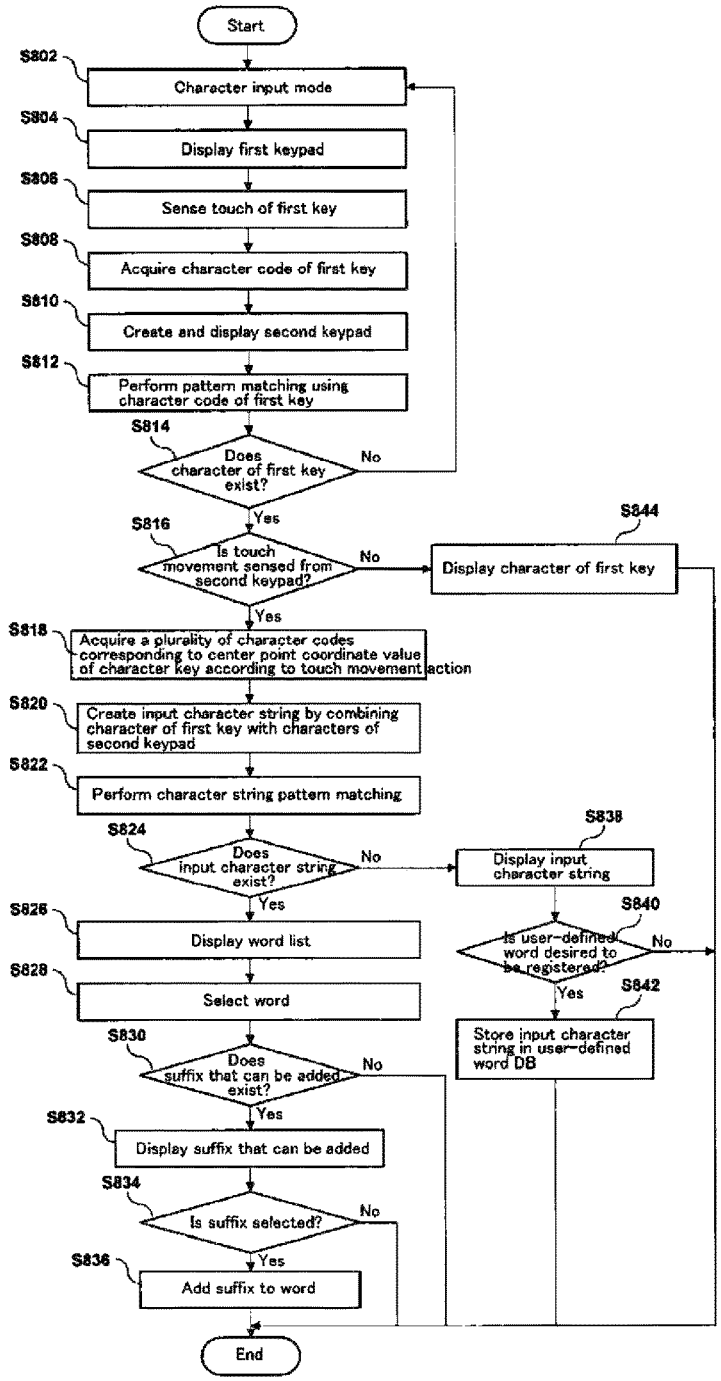
FIG. 8 is a flowchart illustrating a method of inputting characters in a character input device according to an embodiment of the present invention.

FIG. 8 is a flowchart illustrating a method of inputting characters in a character input device according to an embodiment of the present invention.

Referring to FIG. 8, if the character input mode is executed (step S802), the character input device displays a first keypad configured of one or more character keys on a touch screen (step S804).

If touch of a first key is sensed from the first keypad (step S806), the character input device acquires a character code corresponding to the center point coordinate value of the first key (step S808). That is, if initial touch of the first key is sensed, the character input device acquires the center point coordinate value of the first key and acquires a character code corresponding to the center point coordinate value of the first key by searching a first keypad information database provided therein.

Then, the character input device creates a second keypad on the first keypad and switches the input mode to a mode dedicated to character input of the second keypad (step S810), performs pattern matching using the character code of the first key (step S812), and determines whether or not character of the first key exists in a word dictionary database (step S814). That is, if the input mode is switched to a mode dedicated to character input of the second keypad, the character input device opens the word dictionary database and performs pattern matching using the character code of the first key in accordance to the word data structure of a word dictionary. If the character of the first key exists in the word dictionary database as a result of performing the pattern matching, the character input device waits for input of a character in the second keypad input mode, and if a character of the first key does not exist, the system is terminated and returns to the character input mode of the first keypad since it is input of a special character or a character for other purposes.

If the character of the first key exists in the word dictionary database as a result of the determination at step S814, the character input device determines whether or not a touch movement action is sensed from the second keypad (step S816). At this point, the character input device displays the second keypad on the first keypad and determines whether or not a touch movement action such as tapping, dragging, flicking, sliding or the like is sensed from the second keypad.

If a touch movement action is sensed from the second keypad as a result of the determination at step S816, the character input device acquires a plurality of character codes corresponding to the center point coordinate value of a character key according to the touch movement action (step S818). That is, the character input device acquires the center point coordinate value of a character key according to the touch movement action and extracts a plurality of character codes corresponding to the center point coordinate value of the character key by searching the second keypad information database.

Then, the character input device creates input character strings by combining the character of the first key with the characters of the second keypad (step S820), performs a character string pattern matching work between the created input character strings and the words stored in the word dictionary database (step S822), and determines whether or not an input character string exists in the word dictionary database (step S824). At this point, the character input device displays the created input character strings on the touch screen, and if the user selects a desired input character string among the displayed input character strings, the character input device may determine whether or not the input character string exists in the word dictionary database by performing a character string pattern matching work between the selected input character string and the words stored in the word dictionary database.

If the input character string exists in the word dictionary database as a result of the determination at step S824, the character input device extracts words succeeded in the pattern matching from the word dictionary database and displays a word list (step S826). If the input character string exists in the word dictionary and thus the pattern matching is successfully accomplished, the character input device searches the word dictionary database to determine whether or not completed words exist in the word dictionary database at the time point. If completed words exist in the word dictionary database, the character input device extracts and displays the completed words and waits for selection of the user.

If the user selects a desired word from the displayed word list (step S828), the character input device determines whether or not a suffix that can be added to the selected word exists (step S830). That is, if the user selects a desired word from the displayed word list, the character input device determines whether or not a suffix that can be added to the selected word is defined in the word suffix database. If a suffix that can be added is defined in the word suffix database as a result of the determination, the character input device acquires and displays the suffixes that can be added from the word suffix database.

If a suffix that can be added exists as a result of the determination at step S830, the character input device displays the suffixes that can be added (step S832).

If the user selects a desired suffix among the displayed suffixes (step S834), the character input device adds and displays the selected suffix as a suffix of the word (step S836). In this manner, input of a word can be completed.

If an input character string does not exist in the word dictionary database as a result of the determination at step S824, the character input device displays only the input character string (step S838), and if registration of a user-defined word is requested from the user, the character input device stores the input character string into the user-defined word database (step S840).

On the other hand, if a pattern matching process performed on the characters input through the second keypad fails after the character input of the first key, i.e., if the input character string does not exist in the word dictionary database, although the character input device may close the word dictionary database and create a list of input character strings sorted in alphabetical order, this may be a plurality of meaningless character strings. Subsequently, if the input characters correspond to a control keys expressing the end of character input, the input process is completed, and the input mode returns to the first keypad character input mode. The meaningless input character strings created at this point may be a special character string created by a user, not a character string defined as a word in a specific language. That is, words which are not commonly used such as a name of a person, a name of a store, a name of a place and the like may belong thereto. Characters strings individually created by the user's own will like this may be defined and collected as user's own words and registered in the user-defined word database to be used. For example, if a Korean family name 'CHUNG' is once stored in the user-defined word database, the word 'CHUNG' may be extracted and displayed from the user-defined word database by an input character string of only 'CH' in the second input. Accordingly, even a character string created by the user at his or her own will may be output and displayed with a small number of key inputs like a word of a specific language.

Figure 9:
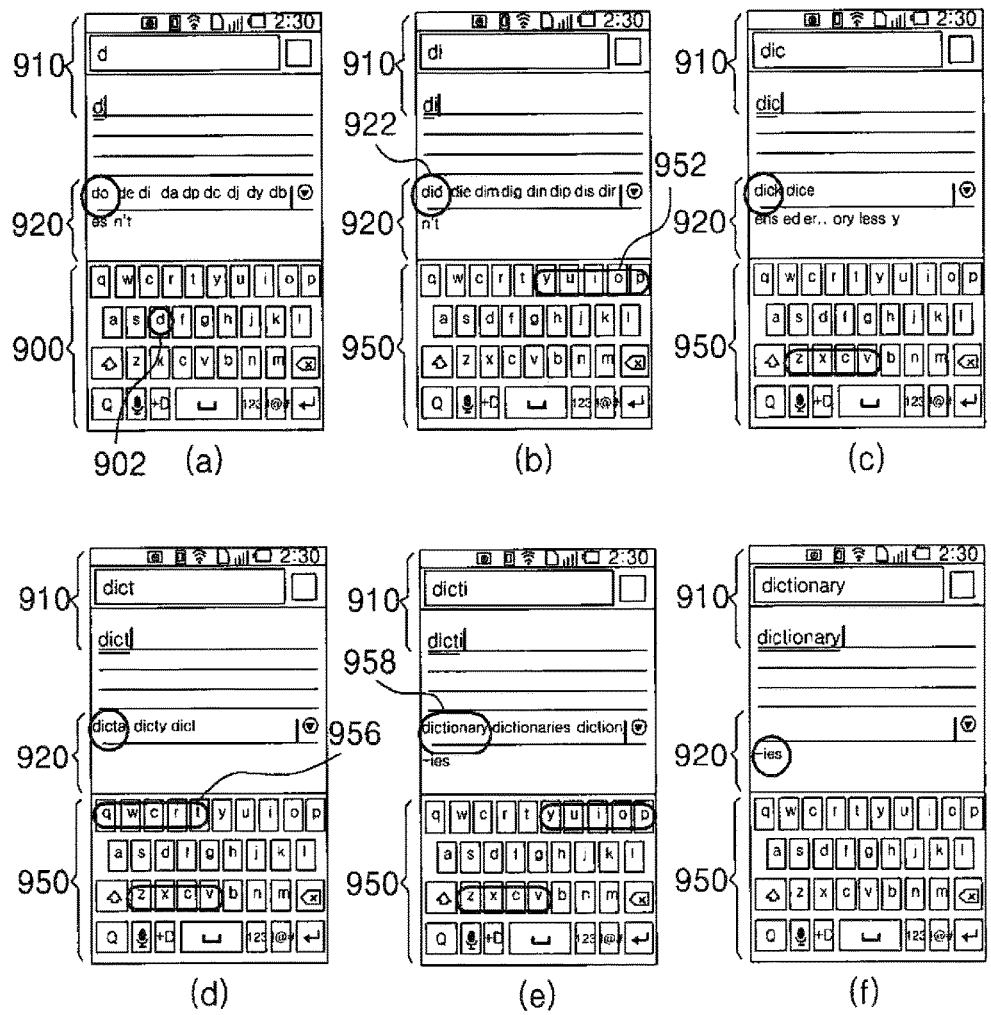
FIG. 9 is an exemplary view showing screens for describing a method of inputting characters using a QWERTY keypad as a first keypad according to an embodiment of the present invention.

FIG. 9 is an exemplary view showing screens for describing a method of inputting characters using a QWERTY keypad as a first keypad according to an embodiment of the present invention.

Referring to FIG. 9, if a user inputs by touch character key 'd' 902 as a first key on the first keypad 900 as shown in FIG. 9(a), the character input device acquires a character corresponding to the selected character key from the first keypad information database and displays the second keypad on the first keypad at the same time as character 'd' is displayed in the character input window 910. In this case, although the first keypad 900 is configured of twenty six character keys, the second keypad is configured of six character keys of 'qwert', 'yuiop', 'asdfg','hjkl', 'zxcv' and 'bnm'. At the, same time, the character input device performs character string pattern matching between the words stored in the word dictionary database and character 'd'. As a result of performing the character string pattern matching, the character input device extracts a list of words such as do, de, di, da and the like from the word dictionary database and displays the words in the word list display area 920. At this point, the character input device may also display suffixes that can be added to the words displayed in the word list display area 920, in the word list display area 920.

Then, if the user touches character key 'yuiop' 952 on the second keypad 950 as shown in FIG. 9(b), the character input device acquires the center point coordinate value of 'yuiop' and acquires at least one or more character codes (y, u, i, o and p) assigned to the center point coordinate value. The character input device creates input character strings of 'dy','du', 'di', 'do' and 'dp' by combining 'd' with 'ye', 'u', 'i' and 'p' included in the character key 'yuiop'. Then, the character input device performs pattern matching between the created input character strings and the word data structure of the word dictionary database, acquires words and input character strings succeeded in the pattern matching from the word dictionary database, and displays them (did, die, dim, dig and the like) in the word list display area 920. This is a case of selecting 'di' from the input character strings by the user, and the words and input character strings displayed in the word list display area 920 may be a list of character strings sorted in order of use frequency. At this point, if the user selects 'did' 922 among the words displayed in the word list display area 920, the character input device may also display 'n't', which is a suffix that can be added to 'did', in the word list display area 920.

If the user inputs by touch character key 'zxcvb' 954 as a third character key while the words and input character strings are displayed as shown in FIG. 9(b), the character input device acquires a plurality of character codes (z, x, c, v and b) assigned to the 'zxcvb' from the second keypad information database and creates input character strings of 'diz', 'dix', 'dic', 'div' and 'dib' by combining 'di' with 'z', 'x', 'c', 'v' and 'b' included in the character key 'zxcvb'. Then, the character input device performs pattern matching between the created input character strings and the word data structure of the word dictionary database and displays a list of words (dick, dice and the like) created as a result of the pattern matching in the word list display area 920 as shown in FIG. 9(c). At this point, if the user selects 'dick' from the word list, the character input device may acquire suffixes (ens, ed, or, ory, less and y) that can be added to the 'dick' from a word suffix database and display the suffixes.

If the user touches character key 'qwer t' 956 as a fourth input in a state as shown in FIG. 9(c), the character input device acquires a plurality of character codes assigned to the 'qwert' and creates input character strings of 'dicq', 'dicw', 'dice', 'dicr' and 'dict' by combining 'dic' with 'q', 'w', 'e', 'r' and 't' includes in the 'qwert' key. Then, the character input device performs pattern matching between the created input character strings and the word data structure of the word dictionary database and displays a list of words (dicta, dicty, dict and the like) created as a result of the pattern matching in the word list display area 920 as shown in FIG. 9(d).

If the user touches character key 'yuiop' 952 as a fifth input on the screen displayed as shown in FIG. 9(d), the character input device acquires a plurality of character codes assigned to the 'yuiop' and creates input character strings of 'dicty', 'dictu', 'dicti', 'dicto' and 'dictp' by combining 'dict' with 'y', 'u', 'i', 'o' and 'p' includes in the 'yuiop' key. Then, the character input device performs pattern matching between the created input character strings and the word data structure of the word dictionary database and displays a list of words (dictionary, dictionaries, diction and the like) created as a result of the pattern matching in the word list display area 920 as shown in FIG. 9(e). At this point, if the user selects 'dictionary' from the displayed word list, the character input device may acquire a suffix (ies) that can be added to the 'dictionary' from the word suffix database and display the suffix.

If the user selects 'dictionary' 958 from the word list displayed in the word list display area of FIG. 9(e), the character input device may display '-ies' which is a suffix that can be added to the 'dictionary' as shown in FIG. 9(f).

Figure 10:
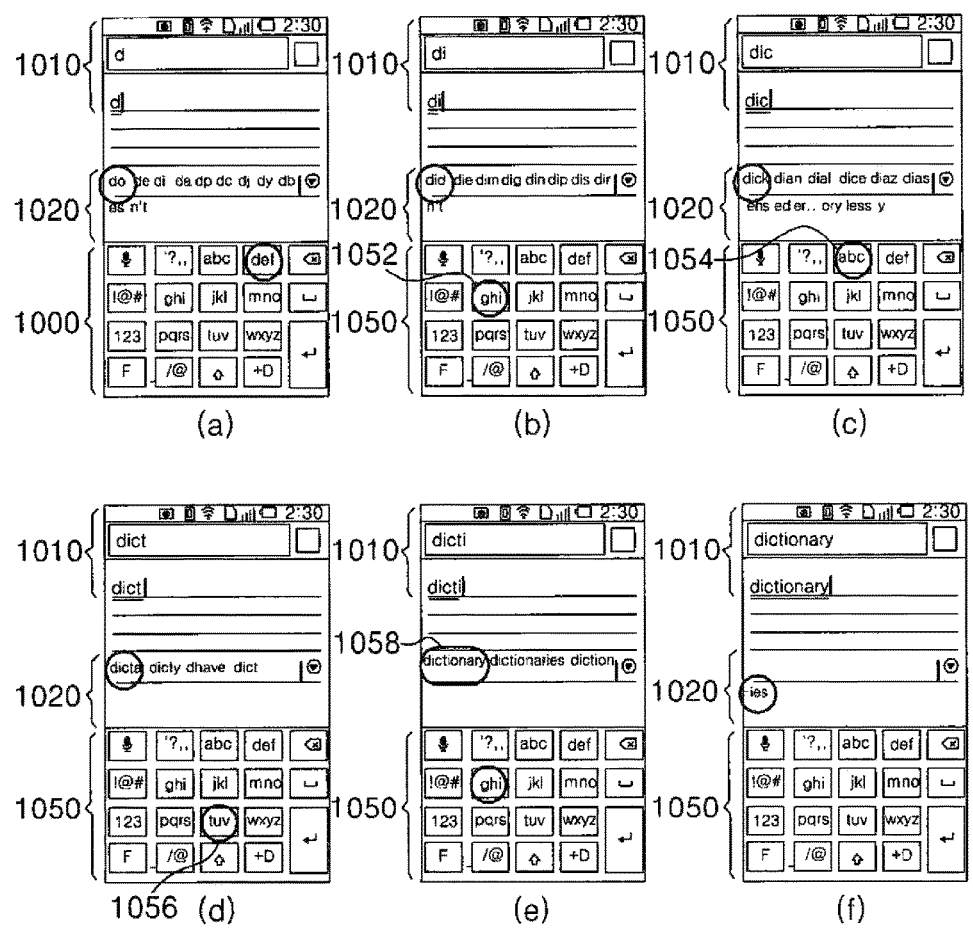
FIG. 10 is an exemplary view showing screens for describing a method of inputting characters using a 12-key alphabet keypad as a first keypad according to an embodiment of the present invention.

FIG. 10 is an exemplary view showing screens for describing a method of inputting characters using a 12-key alphabet keypad as a first keypad according to an embodiment of the present invention.

Referring to FIG. 10, if a user inputs by touch character key 'd' 1002 as a first key on the first keypad 1000 as shown in FIG. 10(a), the character input device acquires a character corresponding to the selected character key from the first keypad information database and displays the second keypad on the first keypad 1000 at the same time as character 'd' is displayed in the character input window 1010. At the same time, the character input device performs character string pattern matching between the words stored in the word dictionary database and character 'd'. As a result of performing the character string pattern matching, the character input device extracts a list of words such as do, de, di, da and the like from the word dictionary database and displays the words in the word list display area 1020. At this point, the character input device may also display suffixes that can be added to the words displayed in the word list display area 1020, in the word list display area 1020.

Then, if the user touches character key 'ghi' 1052 on the second keypad 1050 as shown in FIG. 10(b), the character input device acquires the center point coordinate value of 'ghi', acquires at least one or more character codes (g, h and i) assigned to the center point coordinate value, and creates input character strings of 'dg', dh' and 'di' by combining 'd' with 'g', 'h' and 'i' included in the character key 'ghi'. Then, the character input device performs pattern matching between the created input character strings and the word data structure of the word dictionary database, acquires words and input character strings succeeded in the pattern matching from the word dictionary database, and displays them (did, die, dim, dig and the like) in the word list display area 1020. This is a case of selecting 'di' from the input character strings by the user, and the words and input character strings displayed in the word list display area 1020 may be a list of character strings sorted in order of use frequency. At this point, if the user selects 'did' among the words displayed in the word list display area 1020, the character input device may also display 'n't', which is a suffix that can be added to 'did'.

If the user inputs by touch character key 'abc' 1054 as a third character key while the words and input character strings are displayed as shown in FIG. 10(*b*), the character input device acquires a plurality of character codes (a, b and c) assigned to the 'abc' from the second keypad information database and creates input character strings of 'dia', 'dib' and 'dic' by combining 'di' with 'a', 'b' and 'c' included in the character key 'abc'. Then, the character input device performs pattern matching between the created input character strings and the word data structure of the word dictionary database and displays a list of words (dick, dice and the like) created as a result of the pattern matching in the word list display area 1020 as shown in FIG. 10(*c*). At this point, if the user selects 'dick' from the word list, the character input device may acquire suffixes (ens, ed, or, ory, less and y) that can be added to the 'dick' from a word suffix database and display the suffixes.

If the user touches character key 'tuv' 1056 as a fourth input in a state as shown in FIG. 10(*c*), the character input device acquires a plurality of character codes assigned to the 'tuv' and creates input character strings of 'dict', 'dicu' and 'dicv' by combining 'dic' with 't', 'u' and 'v' includes in the 'tuv' key. Then, the character input device performs pattern matching between the created input character strings and the word data structure of the word dictionary database and displays a list of words (dicta, dicty, dict and the like) created as a result of the pattern matching in the word list display area 1020 as shown in FIG. 10(*d*).

If the user touches the 'ghi' area as a fifth input on a screen displayed as shown in FIG. 10(*d*), the character input device acquires a plurality of character codes assigned to the 'ghi' and creates input character strings of 'dictg', 'dicth' and 'dicti' by combining the 'dict' with 'g', 'h' and 'i' includes in the 'ghi' key. Then, the character input device performs pattern matching between the created input character strings and the word data structure of the word dictionary database and displays a list of words (dictionary, dictionaries, diction and the like) created as a result of the pattern matching in the word list display area 1020 as shown in FIG. 10(*e*). At this point, if the user selects 'dictionary' 1058 from the displayed word list, the character input device may acquire a suffix (ies) that can be added to the 'dictionary' from the word suffix database and display the suffix.

If the user selects 'dictionary' from the word list displayed in FIG. 10(*e*), the character input device may display '-ies' which is a suffix that can be added to the 'dictionary' as shown in FIG. 10(*f*).

Figure 11:
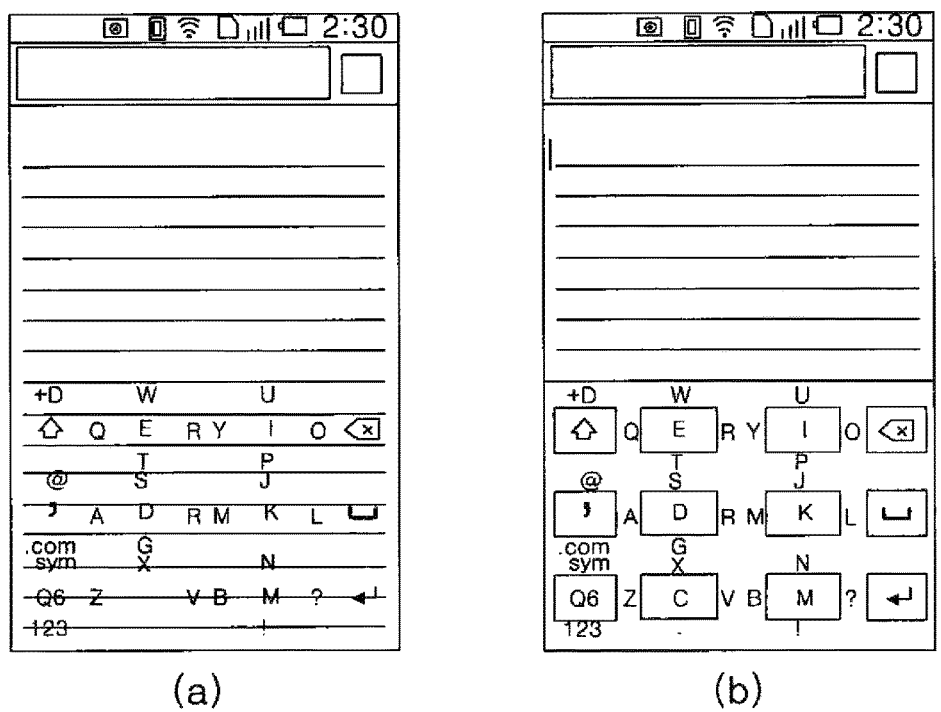
FIG. 11 is an exemplary view showing screens for describing a method of inputting characters when a QWERTY keypad is modified on a transparent keypad according to an embodiment of the present invention.

FIG. 11 is an exemplary view showing screens for describing a method of inputting characters when a QWERTY keypad is modified on a transparent keypad according to an embodiment of the present invention.

Referring to FIG. 11, a QWERTY-based keypad is provided as a first keypad, and six basic character keys such as 'qwert', 'yuiop', 'asdfg','hjkl', 'zxcv' and 'bnm' are provided as character keys of a second keypad.

The input method of a first key may separately input q, w, e, r and t through a touch action such as tapping, sliding or the like. That is, the first key can be selectively input through a tapping action for 'q', a left sliding action for 'w', and upward, downward and right sliding actions for 'e', 'r' and 't'. If touch of the first key begins on the first keypad, the second keypad is displayed on the first keypad. The user may input twenty six full set alphabet characters using only six character keys displayed on the second keypad and, furthermore, may minimize a moving distance of a finger and the number of key touches required for input of a word.

Although the character input device is configured using a variety of materials or through modification of shapes as described above, the same effect and the same processing result can be obtained.

Figure 12:
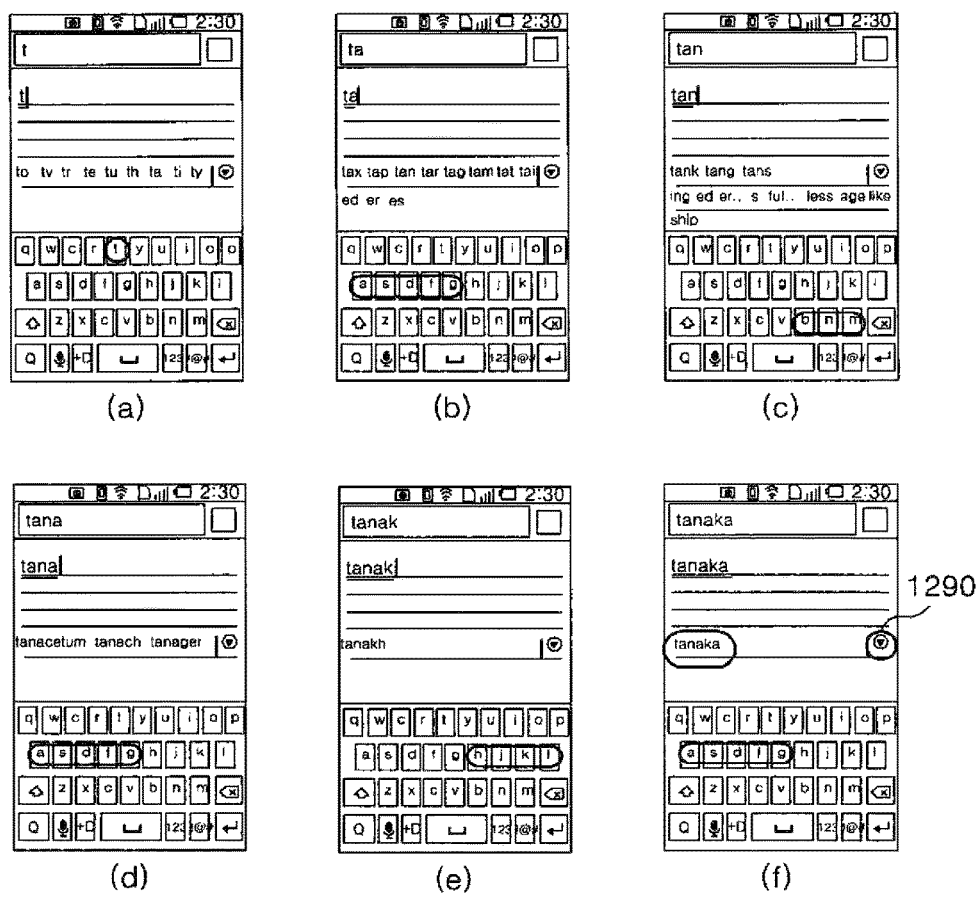
FIG. 12 is an exemplary view showing screens for describing a process of handling an input character string that is not registered in a word dictionary database according to an embodiment of the present invention.

FIG. 12 is an exemplary view showing screens for describing a process of handling an input character string that is not registered in a word dictionary database according to an embodiment of the present invention.

Referring to FIG. 12, this is a case of inputting 'tanaka', which is not registered in an English dictionary as a word.

The character input device displays a corresponding word list until input of 't', 'a' and 'n' is completed as shown in FIGS. 12(*a*) to 12(*c*). It is confirmed that character string 'tan' is included in a word dictionary, and a result thereof is displayed as a word list.

If pattern matching is performed in the word dictionary database after successively inputting character 'a' after the character string 'tan' as shown in FIG. 12(*d*) and then 'k' and 'a' are subsequently input, it is displayed (e.g., in red color) that input character string 'tanaka' is not registered in a word dictionary. If the user presses a user-defined word registration command (+) 1290 to register the displayed input character string as a word, 'tanaka' is registered in the user-defined word database. If 'tanaka' is input thereafter, the character input device considers 'tanaka' as a registered word and handles it as a word registered in the word dictionary database.

Figure 13:
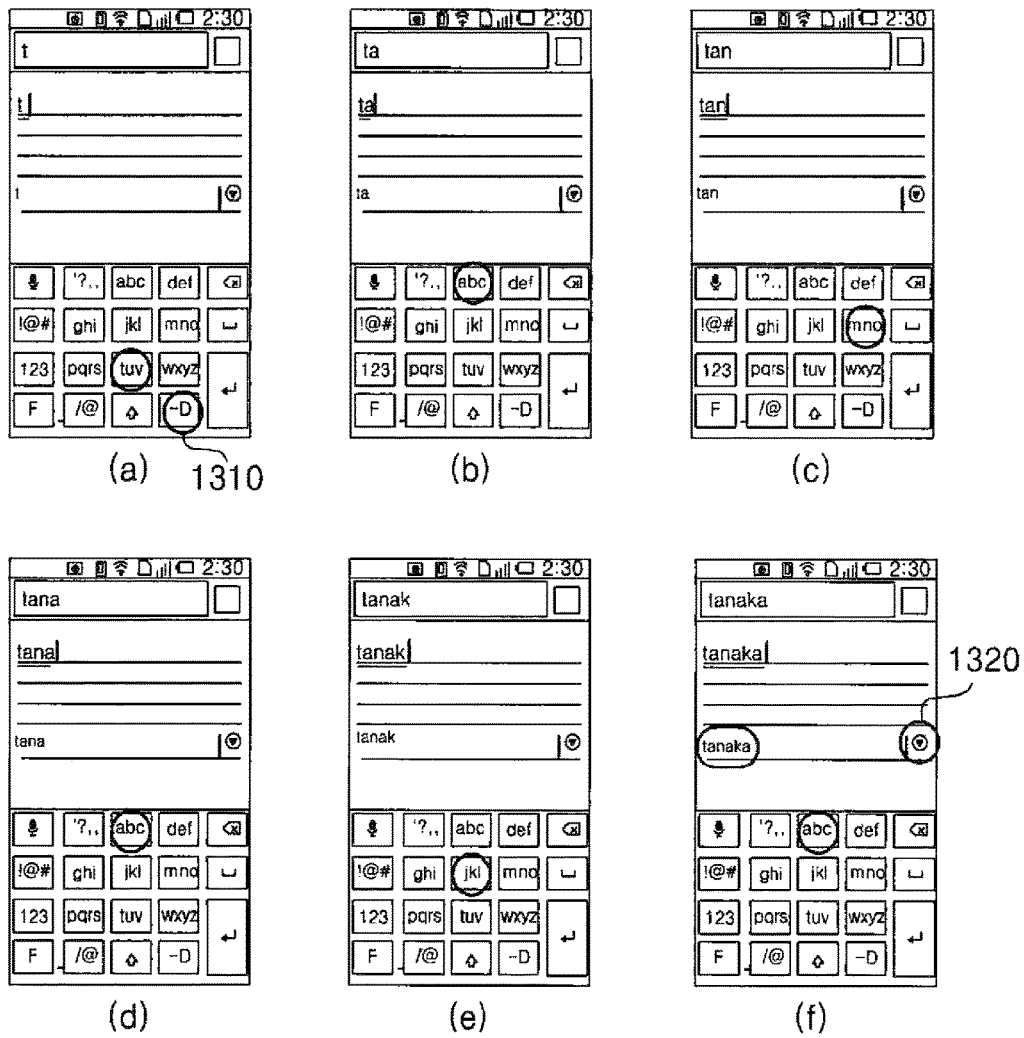
FIG. 13 is an exemplary view showing screens for describing a method of registering a user-defined word according to an embodiment of the present invention.

FIG. 13 is an exemplary view showing screens for describing a method of registering a user-defined word according to an embodiment of the present invention.

Referring to FIG. 13, this is a case separating the word dictionary database using -D key 1310 and registering a user-defined word by inputting characters. Here, the -D key 1310 may be a key corresponding to a command for separating the word dictionary database.

If the user inputs a desired character string ('tanaka') as shown in FIGS. 13(*b*) to 13(*e*) and selects a user-defined word registration command (+) 1320 as shown in FIG. 13(*f*) after pressing the -D key 1310, the character input device registers the input character string ('tanaka') in the user-defined word database. The character string registered in the user-defined word database is thereafter processed and handled inside the system like a regular word defined and registered in the word dictionary database.

The character input device and method according to the present invention can be applied to a character input device of all languages. For example, the character input device and method according to the present invention may obtain the same effect in the case of inputting characters used in Japanese, Chinese, Korean Arabic, Hindi or Russian language, i.e., English Alphabet, Cyrillic Alphabet, Kana characters, Korean characters, symbols or the like.

According to the present invention, characters can be input conveniently and rapidly and error inputs can be reduced by doubly providing small keypads which reduces a moving distance of a finger between keys in a character input device of a mobile or wearable computing device, the character input device of various materials or shapes, for inputting characters through a touch or non-touch action.

In addition, a wearable character input device can be implemented by virtually providing a second keypad capable of simultaneously inputting a plurality of characters when beginning of touch is sensed from a first keypad, which is a real keypad, and providing a word recognition function capable of determining whether or not a character string input through the second keypad is a word defined in a word dictionary database.

In addition, since suffixes that can be added to the character strings input through the second keypad can be displayed and a suffix selected by a user among the displayed suffixes can be added as a suffix of a word selected by the user, it is convenient in that a user does not need to input a whole word that the user desires to input.

In addition, although a small keypad of a wearable device is used, a character input efficiency higher than that of an existing smart phone can be obtained. That is, since the touch area of a character key is increased on a second keypad virtually created on the first keypad, error inputs caused by intruding character key touch areas can be reduced, and thus a user may further conveniently and correctly input a character even in a small character input panel which is a weak point of the wearable device.

In addition, since a character input device of various shapes can be provided to meet the features of a wearable device and the taste of a user, character input stress can be reduced, and a new user experience can be induced.

In addition, when characters are input using a touch screen, a word desired to input can be rapidly and correctly input without pressing several key areas several times.

In addition, efficiency of character input can be improved by reducing a moving distance of a finger required for character input, improving accuracy of character key touch, and minimizing motions of a hand in a variety of character input environments of a user.

It will be understood by those skilled in the art that the present invention may be embodied in other specific forms without departing from the spirit and essential characteristics thereof. The present embodiments described above are therefore to be considered in all respects as illustrative and not restrictive.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

The tangible program carrier can be a computer readable medium, which can be a machine-readable storage device, a machine-readable storage substrate, a memory device, a composition of matter effecting a machine-readable propagated signal, or any combination thereof.

The term "device" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or any combination thereof.

While this disclosure contains specific implementations, these should not be construed as limitations on the scope of any claims, but rather as descriptions of features that may be specific to particular exemplary implementations. Certain features that are described in the context of separate embodiments also can be implemented in combination in a single embodiment. Conversely, various features that are described in the context of a single embodiment also can be implemented separately in multiple embodiments or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing can be advantageous. Moreover, the separation of various system components in the embodiments described above should not be understood as requiring such separation in all embodiments and it should be understood that the described program components and systems can generally be integrated together in a single software product or packaged into multiple software products.

As described above, this specification is not intended to limit the present invention to the presented specific terminologies. Accordingly, although the present invention is described in detail with reference to the examples described above, those skilled in the art may make alterations, changes and modification without departing from the scope of the present invention. The scope of the present invention is defined by the accompanying claims, rather than the above detailed description, and the meaning and scope of the claims and all changes and modifications derived from equivalents thereof should be interpreted as being included in the scope of the present invention.

The invention claimed is:

1. A character input device comprising:
   a touch screen;
   a word dictionary database;
   a first keypad information database for storing information on a first keypad;
   a second keypad information database for storing information on a second keypad; and
   a processor configured to:
      display, in a character input mode, the first keypad configured of at least one or more character keys on the touch screen;
      acquire, when touch of a first input character key is sensed from the first keypad, a character code corresponding to a value of the first input character key from the first keypad information database;
      create and virtually display the second keypad on the first keypad in the same shape as the same character key arrangement constituting the first keypad;
      acquire, when a user's touch input is sensed from the second keypad, at least one or more character codes corresponding to the touch input from the second keypad information database;

create at least one or more input character strings by combining the character code of the first input character key on the first keypad with the character codes acquired by the input characters on the second keypad; and extract and display character strings of a completed word by performing character string pattern matching between the created input character strings and words stored in the word dictionary database, wherein the first keypad and the second keypad are performed with independent character input modes, respectively, wherein character strings acquired from the first keypad and character strings acquired from the second keypad are created and displayed independently, and wherein the character keys on the second keypad for creating at least one or more input character strings by combining the character code of the first input character key on the first keypad with the plurality of character codes acquired by the input characters on the second keypad in a character input device using the first keypad and the second keypad having independent character input and output modes are formed by grouping a plurality of character keys adjacent to each other on the first keypad into one character key of the second keypad.

2. The device according to claim 1, wherein if a character string of a completed word does not exist as a result of performing the character string pattern matching, the processor determines whether or not a user-defined word registration command is input and, if the user-defined word registration command is input, stores the input character string in a user-defined word database as a user-defined word.

3. The device according to claim 1, further comprising a word suffix database for storing suffixes of words, wherein the processor acquires and displays suffixes that can be added to the displayed character strings from the word suffix database and adds a suffix selected by a user among the displayed suffixes as a suffix of a word selected by the user.

4. The device according to claim 1, wherein the processor creates the first keypad configured of character keys having at least one shape among a dot shape, a straight line shape, a curved line shape, a polygonal shape, a circular shape, and a colored shape.

5. The device according to claim 1, wherein coordinate values according to shapes and sizes of the character keys configuring the first keypad and at least one of character codes and character labels corresponding to center point coordinate values of the character keys arranged on the first keypad are stored in the first keypad information database.

6. The device according to claim 1, wherein when touch of the first key is sensed from the first keypad, the processor acquires a center point coordinate value corresponding to the first key and extracts a character code corresponding to the acquired center point coordinate value from the first keypad information database.

7. The device according to claim 1, wherein when touch of the first key is sensed from the first keypad, the processor acquires a center point coordinate value corresponding to the first key, extracts a character code corresponding to the acquired center point coordinate value from the first keypad information database, and then creates another character code of the first key using information obtained by combining the character code with information on an up, down, left or right movement direction.

8. The device according to claim 1, wherein the processor creates the second keypad and virtually and visibly or invisibly displays the second keypad on the first keypad.

9. The device according to claim 1, wherein the processor creates the second keypad configured of character keys having at least one shape among a dot shape, a straight line shape, a curved line shape, a polygonal shape, a circular shape and a colored shape.

10. The device according to claim 1, wherein the touch movement action includes at least one of tapping, dragging, flicking and sliding, and it is an action continued from a first key touch action without a pause.

11. The device according to claim 1, wherein the processor acquires a coordinate value according to the touch movement action on the second keypad and extracts at least one or more character codes corresponding to the acquired coordinate value from the second keypad information database.

12. A method of inputting characters in a character input device provided with a touch screen, the method comprising the steps of:
(a) displaying, in a character input mode, a first keypad configured of at least one or more character keys on the touch screen;
(b) acquiring, when touch of a first input character key is sensed from the first keypad, a character code corresponding to a value of the first input character key, and creating a second keypad on the first keypad virtually and displaying the second keypad on the first keypad visually or unvisually;
(c) acquiring, when a user's touch input is sensed from the second keypad, at least one or more character codes corresponding to the touch input from the second keypad information database;
(d) creating at least one or more input character strings by combining the character code of the first input character key on the first keypad with the character codes acquired from the input characters on the second keypad; and
(e) extracting and displaying character strings of a completed word by performing character string pattern matching between the created input character strings and words stored in a word dictionary database, wherein the first keypad and the second keypad are performed with independent character input modes, respectively, and wherein character strings acquired from the first keypad and character strings acquired from the second keypad are created and displayed independently, and wherein the character keys on the second keypad for creating at least one or more input character strings by combining the character code of the first input character key on the first keypad with the plurality of character codes acquired by the input characters on the second keypad in a character input device using the first keypad and the second keypad having independent character input and output modes are formed by grouping a plurality of character keys adjacent to each other on the first keypad into one character key of the second keypad.

13. The method according to claim 12, further comprising, after step (e), the steps of:
determining, when a specific character string is selected among the character strings of a completed word, whether or not a suffix that can be added to the selected character string exists;

displaying, if suffixes that can be added exist as a result of the determination, the suffixes that can be added; and adding and displaying a suffix selected by a user among the displayed suffixes as a suffix of the selected character string.

14. The method according to claim 12, wherein at step (e), if a character string of a completed word does not exist as a result of performing the character string pattern matching, whether or not a user-defined word registration command is input is determined, and if the user-defined word registration command is input, the input character string is stored in a user-defined word database.

15. The method according to claim 12, wherein step (b) includes the steps of:

acquiring, when touch of the first key is sensed from the first keypad, a center point coordinate value of the first key;

acquiring a character code corresponding to the center point coordinate value of the first key by searching a first keypad information database provided in advance; and creating the second keypad including the character keys of the first keypad and displaying the second keypad on the first keypad.

16. The method according to claim 12, wherein step (b) includes the steps of:

acquiring, when touch of the first key is sensed from the first keypad, a character code corresponding to a center point coordinate value of the first key; and creating, when a touch movement is sensed from the first key, another character code of the first key using information obtained by combining information on a touch movement direction with a code value of the first key.

* * * * *